United States Patent [19]

Meyer et al.

[11] Patent Number: 5,012,906
[45] Date of Patent: May 7, 1991

[54] APPARATUS FOR DISENGAGING A FRICTION CLUTCH WHICH COUPLES AN EXHAUST GAS TURBINE TO AN INTERNAL COMBUSTION ENGINE

[75] Inventors: Emil Meyer, Petershausen; Johann Eichinger, Vaterstetten, both of Fed. Rep. of Germany

[73] Assignee: Carl Hurth Maschinen- und Zahnradfabrik GmbH & Co., Munich, Fed. Rep. of Germany

[21] Appl. No.: 410,593

[22] Filed: Sep. 21, 1989

[30] Foreign Application Priority Data

Sep. 22, 1988 [DE] Fed. Rep. of Germany ....... 3832288

[51] Int. Cl.⁵ .............................................. F16D 43/284
[52] U.S. Cl. ..................................... 192/56 F; 60/608
[58] Field of Search ............ 192/30 V, 56 F, 85 AA, 192/91 A, 103 C, 103 F; 60/624, 597, 598, 608

[56] References Cited

U.S. PATENT DOCUMENTS

| | | | |
|---|---|---|---|
| 2,197,179 | 4/1940 | Hersey | 60/608 |
| 2,402,725 | 6/1946 | Birkigt | 60/608 |
| 2,585,968 | 2/1952 | Schneider | 60/608 |
| 2,642,971 | 6/1953 | Hagenbook | 192/56 F |
| 2,646,150 | 7/1953 | Hobbs | 192/56 F |
| 2,702,619 | 2/1955 | Andershock | 192/56 F |
| 2,803,942 | 8/1957 | Johansson et al. | 60/608 |
| 3,182,777 | 5/1965 | Browning et al. | 192/56 F |
| 3,487,901 | 1/1970 | Kulman | 192/56 F |
| 3,557,635 | 1/1971 | Tuck | 192/56 F |
| 4,145,888 | 3/1979 | Roberts | 60/608 |

FOREIGN PATENT DOCUMENTS

0002436 6/1979 European Pat. Off. .

Primary Examiner—Rodney H. Bonck
Assistant Examiner—Nicholas Whitelaw
Attorney, Agent, or Firm—Flynn, Thiel, Boutell & Tanis

[57] ABSTRACT

A friction clutch for use in a gear changing transmission for facilitating a power transmission from a rotating shaft of a working exhaust-gas turbine onto a crankshaft of an internal combustion engine, which friction clutch, depending on the engine and/or turbine speed, automatically closes in the direction of engagement and opens in the direction of disengagement, with the friction members of the clutch being able to be compressed in the direction of engagement against a spring force (cup springs) by a piston of a rotating cylinder-piston-unit provided on the drive side of the clutch, such that a fluid conveyed from an external pump into the cylinder applies a fluid pressure onto the piston in response to rotation (centrifugal force). The engine lubricant is preferably used as the fluid.

19 Claims, 3 Drawing Sheets

APPARATUS FOR DISENGAGING A FRICTION CLUTCH WHICH COUPLES AN EXHAUST GAS TURBINE TO AN INTERNAL COMBUSTION ENGINE

FIELD OF THE INVENTION

The invention relates to a friction clutch having friction members therein for use in a gear changing transmission for facilitating a power transmission from a working exhaust-gas turbine to a crankshaft of an internal combustion engine. Such turbines are used in commercial vehicles, like trucks and the like to conserve fuel.

BACKGROUND OF THE INVENTION

Pressure-medium operated friction clutches, as they are known in various designs, cannot be used for the above-mentioned purpose, because the starting and turning-off operations must occur independently dependent on the turbine and/or engine speed in order to avoid additional control devices. Also mechanically shiftable friction clutches, which meet the demands of the specific application are not known.

Therefore the basic purpose of the invention is to provide a clutch for the purpose mentioned above.

The purpose is attained by providing a friction clutch having friction members therein which, depending on the speed of the engine and/or the speed of the turbine, automatically closes in the direction of engagement and opens in the direction of disengagement, with the friction members being compressible in direction of engagement against the force of a spring member by a piston of a rotating cylinder-piston-unit provided on a drive side of the clutch, a fluid being provided and conveyed by an external pumping device into a cylinder applying in response to rotation a pressure onto the piston. That is, the supplied fluid applies a pressure onto the piston under the action of centrifugal force in the cylinder rotating dependent on the turbine speed, which pressure compresses the friction members against the force of the spring. When the turbine speed drops and the pressure of the fluid decreases, the clutch is again opened by the spring.

An advantageous embodiment is where the cylinder is connected to a driving element, namely, the output shaft of the turbine and is designed with an annular chamber therein for receiving the piston therein and is supported rotatably on a shaft arranged on a driven side of the clutch. Using the motor lubricant as the fluid for the clutch is very advantageous because no additional closed fluid circuit is needed for the operation of the clutch. The pump, which is provided anyway, supplies also the clutch with oil. Since the pressure of the supplied engine lubricant is not constant and since the cylinder has only a limited volume in which a pressure dependent on the turbine speed is to build up, a relief bore is provided through which all oil not needed for the pressure build-up is discharged or through which a lubricant pressure, which may possibly be too high, is reduced.

The piston is advantageously secured against an unintentional rotation. A limited relative rotation between the piston and the cylinder can thereby be utilized to interrupt the fluid supply in response to the speed on the driven side of the clutch being higher than the speed on the driving side of the clutch. This provides an overload safety measure for the turbine should there occur a sudden speed increase of the engine, for example, during down-shifting on an incline. An advantageous further development of the clutch includes the provision of at least one curved groove which is covered toward the annular chamber by a disk or the like resiliently resting on the piston. The resilient cover of the groove permits the fluid in the groove to escape only slowly during the relative rotation between piston and cylinder, which avoids a sudden opening and closing of the clutch.

A further development of the clutch which includes a device for interrupting the fluid supply at a low speed of said engine (idling speed) is sensible in order to uncouple the turbine from the engine during idling of the engine, even if the clutch is still closed. This is particularly sensible during a sudden speed reduction of the engine, for example, when the vehicle driver's foot slips off from the clutch pedal. An advantageous embodiment for a device for effecting an uncoupling of the turbine from the engine in such cases is through an interruption of the fluid supply to the clutch. Since a 100% seal cannot be achieved with simple structure, a further relief bore is advisable. Since only leakage oil needs to be discharged and the pressure build-up in the cylinder must be assured during normal fluid supply, this bore is to have only a very small cross section.

To protect the clutch against vibrations (rotational irregularities) coming from the engine, which vibrations are very high particularly in the lower speed range of the engine, an attenuating or damping member is provided between the clutch and a crankshaft of the engine. The attenuating or damping member (vibration attenuator) does not need to be integrated into the clutch, but can also be arranged separately from the clutch, for example, within a transmission step or between two transmission steps, which is or are arranged between the clutch and the crankshaft of the engine.

To achieve a satisfactory start of the closing operation without any delays, a further development includes the provision of plural friction members, each of which include friction surfaces which rest with little pressure on one another, also when said clutch is disengaged. One very simple design includes at least one spring for pressing the disk against the piston to cause initial contact of the friction surfaces. To limit the maximum transmittable torque, the path covered by the piston during engagement is limited by a stop.

BRIEF DESCRIPTION OF THE DRAWINGS

The invention will be described hereinbelow with reference to one exemplary embodiment illustrated in the drawings, in which.

DETAILED DESCRIPTION

Figure 1:
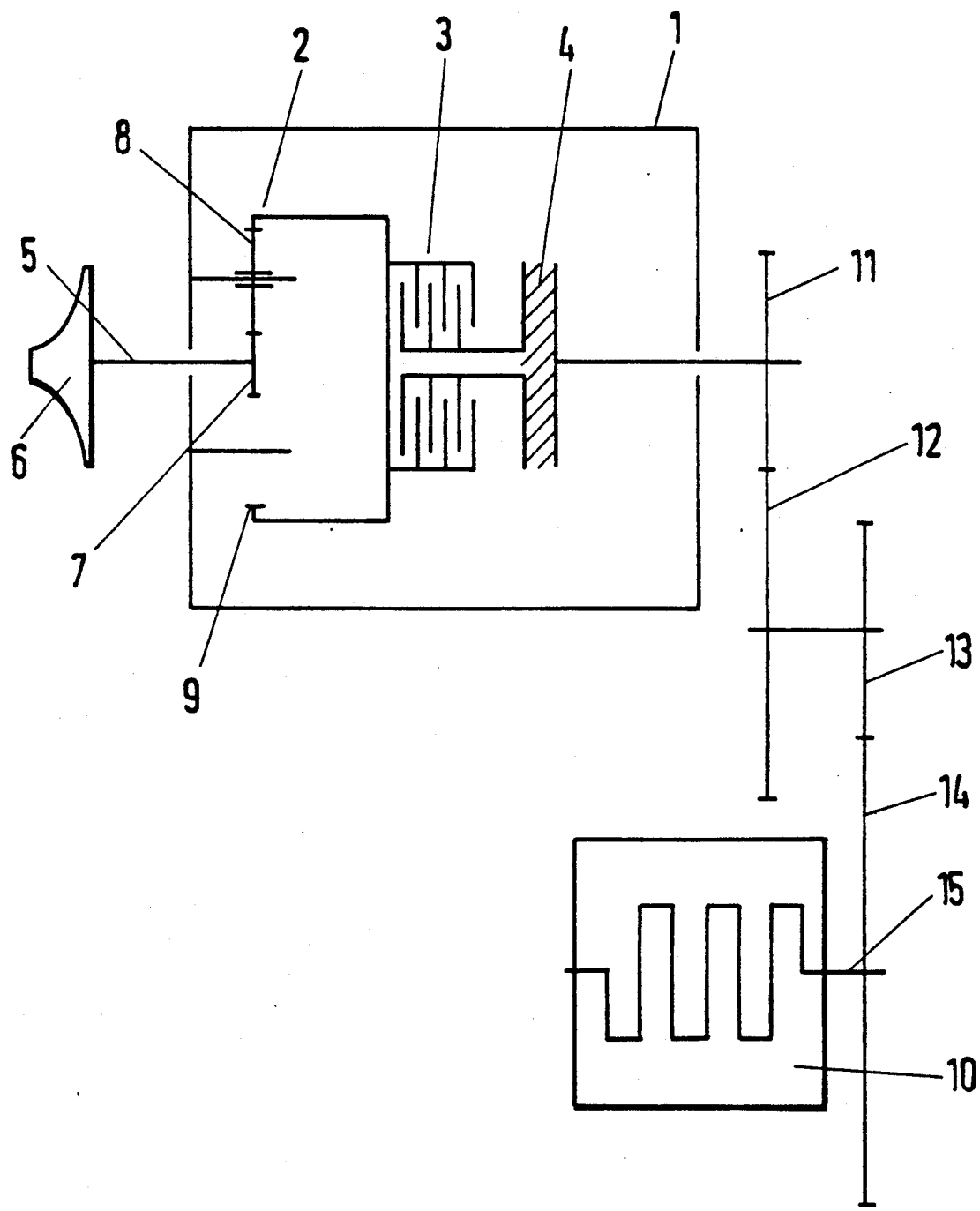
FIG. 1 illustrates a schematic diagram of a transmission into which a clutch embodying the invention is inserted.

A planetary gearing 2, a friction clutch 3 (hereinafter referred to only as a clutch 3) and a vibration attenuator or damper 4 are series connected and housed in a transmission housing 1. A drive occurs from a turbine shaft 5 of a working exhaust-gas turbine 6 onto a sun gear 7 of the planetary gearing 2 designed with stationary planet gears 8. The planetary gearing 2 through planet gears 8 effect a rotating of a ring gear 9 and the clutch 3 connected to it. The clutch 3, which will be discussed in greater detail later on, couples and uncouples the turbine shaft 5 to and from, respectively, the crankshaft 15 of an internal combustion engine 10. Gears 11, 12, 13, 14 are arranged between the driven part of the clutch 3 and the engine 10 for the purpose of facilitating a speed adjustment. The gears 11, 12, 13 and 14 are housed in a separate housing (not illustrated). The vibration attenuator or damper 4 is provided on the output side of the clutch 3 immediately following the clutch.

Figure 2:
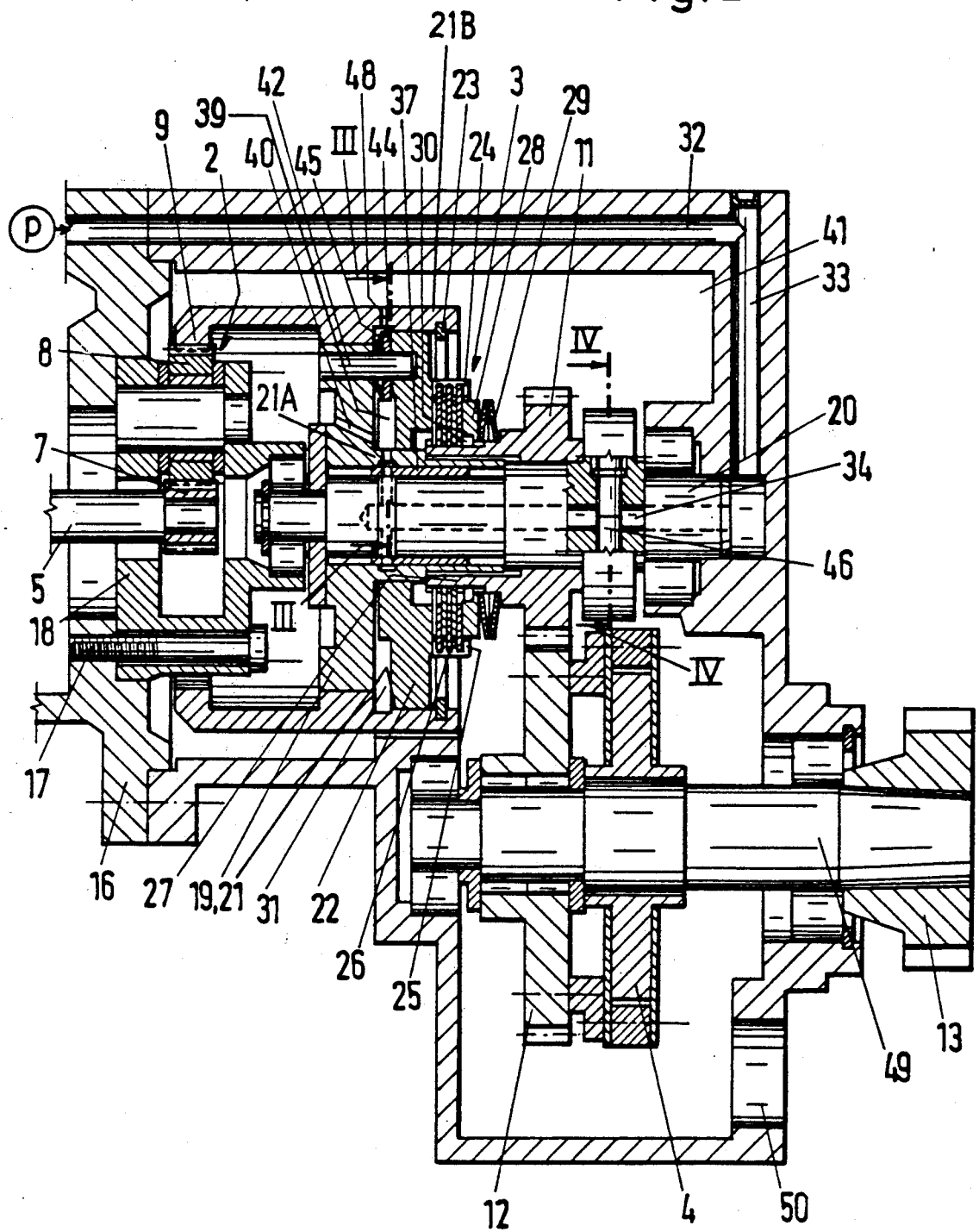
FIG. 2 is a cross-sectional view of such a transmission with a slightly modified design.

Details of the clutch 3 or the transmission are illustrated in FIG. 2, where corresponding parts have the same reference numerals as in FIG. 1. The ring gear 9 of the planetary gearing 2 is supported on a shaft 20 through a ring-gear carrier 19, to which it is connected fixedly and pressure-tight. The shaft 20 is rotatably supported in the transmission housing 1 and in a planet gear carrier 18. The planet gear carrier 18 is, for structural reasons, secured as by bolts 17 to the housing 16 of the working exhaust-gas turbine. The carrier 18 could, however, also be secured directly to the transmission housing 1.

The ring gear 9 with the ring-gear carrier 19 forms a cylinder 21, in which a ring piston 22 is movably guided, however, pressure-tight The sealing elements do not need to be illustrated and described, since they are known. A snap ring 23 in the cylinder limits the path over which the ring piston 22 can be moved. An annular shoulder on the ring piston 22 has notches 24 for receiving a nose part of so-called external disks 25. The latter cooperate with so-called internal disks 26, which engage with an internal tooth system a corresponding profile in a sleeve-shaped shoulder 27 on the gear 11. The so formed disk package abuts a pressure plate 28 on a side remote from the ring piston 22. The pressure plate 28 is urged by cup springs 29 in the direction of clutch engagement. The cup springs 29 are supported on the gear 11 and press the pressure plate 28 against a snap ring 30 arranged such that the disks are not compressed by the pressure plate 28 or by the cup springs 29 when the clutch is open.

Fluid is continuously fed from an external pump P to an annular chamber 31 formed by the cylinder 21 and between the ring piston 22 ring gear carrier 19. The fluid is for simplicity reasons a lubricant of the engine 10 which is fed by the lubricant pump P of the engine through not illustrated pipelines to the transmission housing 1. Bores 32, 33 are for this purpose provided in the housing 1, through which bores 32, 33 oil is fed to a central bore 34 in the shaft 20 and thence on through radial bores 35 in the shaft 20, 36 in a sleeve 37 and 38 in a wall 21A of the cylinder 21 and through a slot 39 on a side of the ring piston 22 remote from the clutch 3 into the annular chamber 31.

Through a measured lubricant feed and suitable dimensioning of the piston surface a pressure builds up in the annular chamber 31 dependent on the speed of the turbine by rotating the cylinder filled with the lubricant as fluid. The pressure increases at a squared exponential rate with respect to the rotative speed until the retaining force of the cup springs 29 is exceeded and thus the disk package 25, 26 is compressed. The torque emitted by the turbine is in this manner transmitted through the gears 11, 12, 13, 14 onto the crankshaft of the engine 10. The transmittable torque depends on the number of friction surfaces, the friction value of the disks and the contact pressure of the piston, which as a variable depends on the speed of the turbine.

The transmittable torque resulting from these three values must always be greater than the torque output from the turbine. However, torque peaks coming from the side of the engine may not result in an overloading of the turbine. This is particularly valid for maximum turbine speed, where the torque to be transmitted by the clutch reaches its maximum value. In order to limit also in this point of operation the relationship between the torque transmittable from the clutch and the torque emitted by the turbine to a value nondamaging for the entire aggregate, in particular, however, for the turbine, the contact pressure of the piston 22 is limited by the initially pretensioned cup springs 29, which upon reaching the initial tension give way suitably to the piston 22 until the piston rests on the snap ring 23. The now existing initial tension can no longer be exceeded, since a further increase of the pressure in the annular chamber 31 would result in a relative slipping of the disks 25, 26.

To build up the pressure in the annular chamber 31, an amount of oil corresponding with the volume of the annular chamber is only needed, aside from leakage. Since, however, oil is continuously supplied, relief bores 40 are provided for discharging the excessive oil. The relief bores 40 connect the annular chamber 31 to the transmission inner chamber 41. It is necessary for a satisfactory pressure build-up in the annular chamber to let the relief bores originate from a point with a peripheral speed which is as low as possible, that is, in the area of the smallest diameter of the annular chamber 31.

Figure 3:
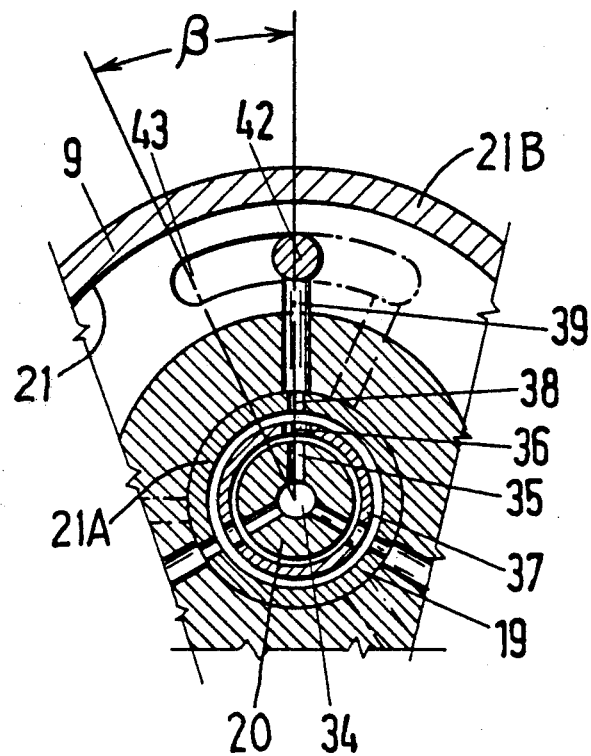
FIG. 3 is a partial cross-sectional view taken along line III—III of FIG. 2.

Pins 42 are secured tightly in the ring gear carrier 19 and extend axially parallel with respect to the axis of rotation of the friction clutch 3. The pins 42 project into corresponding recesses or grooves 43 in the ring piston 22 and prevent same from an undesired rotation relative to the cylinder 21. These recesses 43 have in the illustrated exemplary embodiment an arcuate shape and extend circumferentially concentrically with respect to the axis of rotation curved over an angle $\beta$ (FIG. 3). The pins 42 rest during normal operation, that is, when the turbine 6 drives, on the right— referred to FIG. 3—end of the grooves 43. If, for whatever reasons, the speed of the engine 10 increases suddenly to a level where the driven side of the clutch 3, thus the ring piston 22 rotates faster than the driving side and passes same, then this is only possible until the pins 42 contact the left—again referred to FIG. 3—end of the grooves 43 (dashed contour in FIG. 3). The oil supply to the annular chamber 31 between the bores 38 in the wall 21A in the cylinder 21 and the slot 39 in the ring piston 22 is in this position interrupted with the result, that the clutch opens up because of its leakage and interrupts the connection between the turbine 6 and the engine 10.

In order to prevent during the relative rotation of the ring piston 22 a sudden change of the pin location from one end of the groove to the other end, the grooves 43 are covered in direction of the annular chamber 31. This can occur with by use of a disk 44 in front of each groove or with one single annular disk covering all grooves 43. The disks 44 (or rather the disk) are (or rather is) pressed against the ring piston 22 by springs 45, so that the oil existing in the grooves 43 will, so to speak, be squeezed out against the resilient disks, thus achieving the desired attenuating effect.

The springs 45 are adjusted with respect to their initial force such that they not only press the disks 44 against the ring piston 22, but moreover cause the disks 25, 26, through the action thereon by the ring piston 22, to rest on one another even when the clutch is open. However, the clutch has thereby still so much slippage, that the relative rotation of the ring piston 22 is not hindered. Thus, the springs 45 present only a so-called initial force to make the coupling operation easier.

Figure 4:
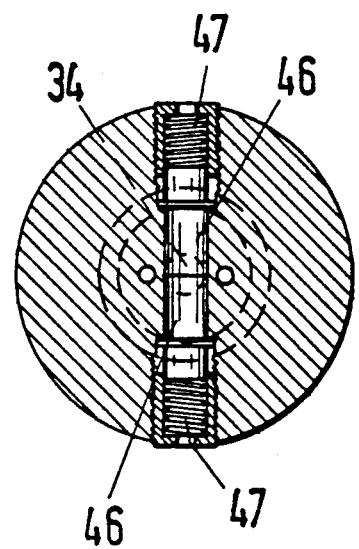
FIG. 4 is a partial cross-sectional view taken along the line IV—IV of FIG. 2.

In order to uncouple the turbine in the low speed range of the engine from the engine, in particular in the case of a sudden speed reduction of the engine 10, an interruption of the oil supply to the clutch is provided for such cases. Two pistons 46 are arranged opposite one another in a radial through-bore in the shaft 20, the faces of which rest on one another under the pressure of springs 47 (FIG. 4) and, since the diameter of the pistons 46 is greater than the one of the bore 34, close off the bore 34. Each piston 46 projects thereby up to the axis of rotation of the shaft 20 into the bore 34. Only with an increasing speed of the shaft 20 are the pistons 46 urged radially outwardly under the influence of a centrifugal force against the action or return force of the springs 47 and thus open the bore 34 for the flow of oil. The engaged pistons 46 do not assure a 100% seal. In order to prevent the oil moving through the gap from building up a pressure sufficient for clutch engagement in the annular chamber 31, a second relief bore 48 is provided in the wall 21B of the cylinder 21, which bore 48 connects the annular chamber 31, in the area of its largest diameter, to the transmission chamber 41 and has a very small cross section, that is, substantially smaller than the relief bores 40. Otherwise, it would not be possible, not even during normal operation, for pressure to build up in the annular chamber.

The gears 11, 12 in the modification of the exemplary embodiment illustrated in FIG. 2 are also stored in the transmission housing 1. The gear 12 is thereby rotatably supported on a driven shaft 49 and is connected to the driven shaft 49 through the vibration attenuator or damper 4. The gear 13 is mounted on the free end of the driven shaft 49, which free end projects from the transmission housing 1. The gear 13 mates with the gear 14 (not illustrated here). Instead of the gear 13, a flange could also be mounted for connection to the crankshaft 15 or to an additional transmission with the gears 13, 14. The vibration attenuator or damper 4 is in the modification according to FIG. 1 arranged approximately like the gear 11 in FIG. 2 on the shaft 20. The vibration attenuator or damper 4 has in both cases the task of keeping rotational irregularities, which can be very high in particular in the low speed range, substantially away from the clutch and thus also from the turbine 6. In spite of its, if necessary, separate arrangement, the vibration attenuator or damper 4 is an important part of the clutch. This is also true, when the vibration attenuator or damper is arranged at a different, here not mentioned, point between the crankshaft 15 of the engine 10 and the actual clutch 3.

The oil, which moves through the relief bores 40, 48 and at other points into the transmission chamber 41, can return through a bore 50 in the transmission housing 1 directly or through not illustrated pipelines to the engine 10.

The embodiments of the invention in which an exclusive property or privilege is claimed are defined as follows:

1. An apparatus, comprising: a friction clutch which can be closed to effect clutch engagement and opened to effect clutch disengagement, including a ring piston movably supported in an annular chamber of a rotatably supported cylinder member rotatably driven by driving means, said ring piston moving against a force of a spring to compress friction members of said clutch to effect engagement thereof in response to pressure of a fluid supplied form a pump into said annular chamber of said cylinder member, said annular chamber communicating with a location external to said friction clutch through a relief bore extending through said cylinder member from a point in said chamber having a relatively low peripheral speed, rotation of said ring piston relative to said cylinder member being limited by a pin fastened in said cylinder member and projecting approximately axially into a recess provided in said ring piston, said driving means including an exhaust-gas turbine operatively coupled to said cylinder member; an internal combustion engine having a crankshaft driven by an output part of said friction clutch; and means for interrupting the fluid supply to said annular chamber in response to the occurrence of either of first and second conditions, said first condition existing when a speed of said output part becomes greater than the speed of said cylinder member, and said second condition existing when said engine is idling.

2. The apparatus according to claim 1, wherein said recess receiving said pin is a groove curved concentrically with respect to an axis of rotation of said ring piston, said ring piston being rotatable relative to said cylinder through an angular range limited by said pin engaging ends of said curved groove between a first position which permits the fluid supply into said chamber in said cylinder member and a second position interrupting the fluid supply into said chamber.

3. The apparatus according to claim 2, wherein an axial end of said curved groove opening into said annular chamber is covered by an element, and including resilient means for resiliently urging said element against said ring piston.

4. The apparatus according to claim 1, wherein said interrupting means includes two further pistons radially movably arranged in a shaft having a concentric bore therethrough for facilitating the fluid supply to said chamber, said further pistons each having a diameter at least as large as the diameter of said concentric bore, mutually adjacent ends of said further pistons facing and being engageable with one another during idling of the motor, and includes further springs for resiliently urging said further pistons into contact at a midpoint of said bore to thereby obstruct said bore, wherein an increased speed of said engine causes said pistons to move apart under the action of centrifugal force against the urging of said further springs to thereby facilitate a free flow of fluid through said bore.

5. The apparatus according to claim 1, wherein a lubricant of said engine is used as said fluid for controlling operation of said friction clutch.

6. The apparatus according to claim 5, wherein said annular chamber communicates with a location external to said friction clutch through a further relief bore communicating with said chamber at a point having a relatively high peripheral speed, said further relief bore having a substantially smaller cross sectional size than said first-mentioned relief bore.

7. The apparatus according to claim 1, wherein said friction members each include friction surfaces which rest with a small pressure on one another when said friction clutch is disengaged.

8. The apparatus according to claim 3, wherein said resilient means includes a spring which presses said element against said ring piston and causes initial contact of friction surfaces on said friction members.

9. The apparatus according to claim 1, wherein axial movement of said ring piston during engagement is limited by a stop in order to limit a torque transmittable by said friction clutch.

10. An apparatus comprising: a rotatably supported input part, an exhaust gas turbine drivingly coupled to said input part, an internal combustion engine having a crankshaft, a rotatably supported output part drivingly coupled to said crankshaft, selectively actuable clutch means for drivingly coupling said input part to said output part, first means for deactuating said clutch means when said engine is idling, and second means for deactuating said clutch means when said output part is rotating faster than said input part.

11. The apparatus recited in claim 10, wherein said first means includes a bore extending through said output part, said clutch means being respectively actuated and deactuated in response to the presence and absence of a fluid pressure in said bore, and means responsive to centrifugal force generated by rotation of said output part for respectively permitting and obstructing fluid flow through said bore in said output part.

12. The apparatus recited in claim 11, wherein said bore is a central axial bore through said output part, said means responsive to centrifugal force including two further bores in said output part which each communicate with and extend radially outwardly in opposite directions from said first-mentioned bore, first and second pistons each movably supported in a respective one of said further bores for movement between positions engaging and spaced from each other, and resilient means for yieldably urging each of said first and second pistons toward the other thereof.

13. The apparatus recited in claim 10, wherein said second means includes said clutch means having first and second parts supported for relative rotation between first and second angular positions, wherein when said clutch is engaged said input part is drivingly coupled to said first part and said second part is drivingly coupled to said output part, said first and second parts being in said first angular position when said clutch means is engaged and said input part is rotating at least as fast as said output part and being in said second angular position when said clutch is engaged and said output part is rotating faster than said input part, said second means effecting said deactuating of said clutch means in response to movement of said first and second parts to said second angular position.

14. The apparatus recited in claim 13, wherein said clutch means is fluid pressure actuated, one of said first and second parts being a member having an opening therein and the other thereof being a piston movably supported within said opening in said member, said piston and said member defining a fluid chamber on one side of said piston, said clutch means being respectively engaged and disengaged when said piston is respectfully in first and second axial positions, said second means including said member and piston having respective bores therein which are aligned and in fluid communication and are offset and out of fluid communication when said piston and member are respectively in said first and second angular positions, said bore in said piston being in communication with said fluid chamber.

15. The apparatus recited in claim 14, wherein said second means includes means defining a relief bore communicating at one end with said fluid chamber and at an opposite end with a location of low pressure, said clutch means including means for supplying pressurized fluid to said bore in said member.

16. The apparatus recited in claim 14, including damping means for effecting fluid damping of relative movement of said piston and member between said first and second positions.

17. The apparatus recited in claim 16, wherein said damping means includes an arcuate groove in a surface of one of said piston and said member and an axially extending pin which is anchored in the other thereof, which slidably engages said grooves and which has a diameter approximately equal to the width of said groove, and element disposed against said surface of said one of said piston and member so as to cover at least a portion of said groove and having an opening which has a cross-sectional size congruent to the cross-sectional size of said pin and which has said pin extending therethrough, and a spring resiliently urging said element against said surface on said one of said piston and member.

18. The apparatus recited in claim 14, wherein said member is said first part and is a portion of said input part, said opening in said member being a circular recess concentric to an axis of rotation of said first part, wherein said piston is annular, wherein said clutch means includes a plurality of first annular friction disks which are supported against rotation on said piston and a plurality of second annular friction disks which are supported against rotation on said output part and which are interleaved with said first friction disks.

19. The apparatus recited in claim 18, wherein said clutch means includes a pressure plate supported for axial movement parallel to said piston on a side of said friction disks remote from said piston, and including resilient means for yieldably resisting movement of said pressure plate in a direction away from said frictions disks.

* * * * *

UNITED STATES PATENT AND TRADEMARK OFFICE
CERTIFICATE OF CORRECTION

PATENT NO. : 5 012 906

DATED : May 7, 1991

INVENTOR(S) : Emil MEYER et al.

It is certified that error appears in the above-identified patent and that said Letters Patent is hereby corrected as shown below:

Column 6, line 6; change "form" to ---from---.

Column 8, line 27; change "grooves" to ---groove---.

Signed and Sealed this

Thirteenth Day of April, 1993

Attest:

STEPHEN G. KUNIN

Attesting Officer

Acting Commissioner of Patents and Trademarks